(12) United States Patent
Goto et al.

(10) Patent No.: US 7,217,194 B2
(45) Date of Patent: May 15, 2007

(54) CONSTANT VELOCITY UNIVERSAL JOINT

(75) Inventors: Tatsuhiro Goto, Shizuoka-ken (JP);
Hiroshi Murakami, Shizuoka-ken (JP);
Masahide Miyata, Shizuoka-ken (JP);
Mikio Tomiyama, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 167 days.

(21) Appl. No.: 10/902,264

(22) Filed: Jul. 30, 2004

(65) Prior Publication Data
US 2005/0059497 A1  Mar. 17, 2005

(30) Foreign Application Priority Data
Aug. 4, 2003 (JP) ............... 2003-285871

(51) Int. Cl.
*F16D 3/205* (2006.01)
(52) U.S. Cl. .................... 464/111; 464/905
(58) Field of Classification Search ............ 464/111, 464/905
See application file for complete search history.

(56) References Cited

U.S. PATENT DOCUMENTS 5,129,860 A   7/1992  Asahara et al.
6,478,682 B1 * 11/2002  Kura et al. ............ 464/111
2003/0073501 A1 * 4/2003  Goto et al. ............. 464/111
2003/0130045 A1   7/2003  Kura et al.

FOREIGN PATENT DOCUMENTS

JP   2000-320563   11/2000

OTHER PUBLICATIONS

Machinery's Handbook, 25th ed., New York, Industrial Press, 1996. p. 707. TJ151.M3 1996.*
Univeral Joint and Driveshaft Design Manual, AE-7, Society of Automotive Engineers, Inc., Warrendale, PA, pp. 131 and 140, TJ1079.S62 1979.*

* cited by examiner

*Primary Examiner*—Greg Binda
(74) *Attorney, Agent, or Firm*—Arent Fox, LLC.

(57) ABSTRACT

A constant velocity universal joint includes an outer joint member has three track grooves extending axially in an inner circumference portion thereof with a roller guide surface extending axially on each side of the respective track grooves; a tripod member has three trunnions protruding in the radial direction; and a roller mechanism is mounted in each of the trunnions of the tripod member. The roller mechanism is capable of swinging and oscillating freely with respect to the trunnions, and has a roller guided along the roller guide surface in the direction parallel to the axis line of the outer joint member. An outer peripheral surface of the roller, which is made by ground-finishing, is in contact with the roller guide surface, and has a surface roughness of 0.35 Ra or less.

5 Claims, 3 Drawing Sheets

CONDITIONS OF MEASURING INDUCED THRUST: TORQUE T = 294 Nm, ROTATIONAL SPEED S = 150 rpm, AND OPERATING ANGLE θ = 0 TO 15 DEGREES
TARGET INDUCED THRUST VALUE AFTER ENDURANCE TEST: 30 N

CONSTANT VELOCITY UNIVERSAL JOINT

BACKGROUND ART

The present invention relates to a sliding type tripod constant velocity universal joint applicable to a power transmission unit in vehicles, aircrafts, vessels, and various industrial equipment. Generally, a constant velocity universal joint is a type of universal joints for connecting two shafts, a driving shaft and a driven shaft, and capable of transmitting rotational force at a constant velocity even if there is an angle between the two shafts. A sliding joint is a joint which allows relative displacement of the two shafts in the axial direction by the plunging of the joint. A tripod type joint is designed to transmit torque between two shafts by coupling a tripod member having three trunnions protruding in the radial direction to one of the shafts, while coupling an outer joint member with a hollow cylindrical shape provided with three track grooves extending in the axial direction to the other shaft, such that the trunnions of the tripod member are received in the track grooves of the outer joint member.

A tripod type constant velocity universal joint is an example of constant velocity universal joints used as means for transmitting rotational force from a vehicle engine to wheels at a constant velocity. The tripod type constant velocity universal joint is constructed to couple two shafts, a driving shaft and a driven shaft, such that rotational torque can be transmitted at a constant speed even when a working angle is formed by the two shafts, and their relative displacement in the axial direction is allowed.

In general, a tripod type constant velocity universal joint is principally constituted by an outer joint member having three track grooves formed in the inner circumference to extend in the axial direction, and roller guide surfaces extending in the axial direction on the opposite sides of each of the track grooves; a tripod member having three trunnions protruding in the radial direction; and a roller accommodated rotatably between each of the trunnions of the tripod member and the corresponding roller guide surfaces of the outer joint member. One of the two shafts is coupled to the outer joint member and the other is coupled to the tripod member.

The trunnions of the tripod member and the roller guide surfaces of the outer joint member are thus engaged with each other via the rollers in the rotational direction of the two shafts, whereby the rotational torque is transmitted from the driving shaft to the driven shaft at a constant speed. In addition, each of the rollers rolls on the roller guide surfaces while rotating with respect to the trunnion, whereby relative displacement in the axial direction and relative angular displacement between the outer joint member and the tripod member are absorbed.

One type of such a tripod type constant velocity universal joint is configured such that a roller is mounted on the outer peripheral surface of a trunnion with a plurality of needle rollers interposed therebetween. Since the roller and the roller guide surface are positioned obliquely to each other along with the inclination of the trunnion when rotational torque is transmitted with a working angle being formed between the outer joint member and the tripod member, the roller will slip with respect to the roller guide surface to inhibit the smooth rolling of the roller, posing a problem of increasing the induced thrust. Also, the frictional force between the roller and the roller guide surface will increase the sliding resistance between the outer joint member and the tripod member during their relative displacement in the axial direction.

It should be noted that the "induced thrust" refers to the thrust force that is generated by friction inside a constant velocity universal joint when torque is applied to the joint at a certain angle during rotation thereof. Typically, this rotational force occurs strongly as a tertiary component in a tripod type joint. Also, the "sliding resistance" refers to a magnitude of the axial frictional force generated when an outer joint member and a tripod member slide with respect to each other in a sliding joint such as a tripod type constant velocity universal joint.

For the purpose of solving the problem that a roller is positioned obliquely to a roller guide surface, and reducing the induced thrust and the sliding resistance, there have been proposed various types of tripod type constant velocity universal joints having a roller mechanism that allows a roller to tilt or be axially displaced freely with respect to a trunnion. One of such known tripod type constant velocity universal joints is configured such that a roller is mounted rotatably to a ring with a plurality of needle rollers interposed therebetween to constitute a roller mechanism (roller assembly) and the inner peripheral surface of the ring is formed such that the cross section is of a circular convex shape and fitted externally on the outer peripheral surface of the trunnion (see FIG. 11(A) of Japanese Patent Laid-Open Publication No. 2000-320563, for example). According to such a configuration, the slip between the cylindrical inner peripheral surface of the ring and the outer peripheral surface with a convex spherical shape of the trunnion allows the roller mechanism to tilt and be axially displaced with respect to the trunnion, and therefore the roller can be prevented from being positioned obliquely to the roller guide surface.

Additionally, the cross section of the trunnion is formed into such a shape, elliptic shape for example, that allows the trunnion to contact the inner peripheral surface of the ring in the direction perpendicular to the axis of the joint and forms a gap between the trunnion and the inner peripheral surface of the ring in the axial direction of the joint (see FIG. 1(B) of Japanese Patent Laid-Open Publication No. 2000-320563, for example). In this manner, it is possible to allow the trunnion to tilt with respect to the outer joint member without changing the attitude of the roller assembly when the joint is set with a working angle. Furthermore, since the contact ellipse between the ring and the outer peripheral surface of the trunnion transforms from an ellipse that is long sideways towards a point, the frictional moment acting to tilt the roller assembly is reduced. As a result, the attitude of the roller assembly is allowed to be always stable, and the roller is held parallel to the roller guide surface and hence is allowed to roll smoothly.

In the meantime, the induced thrust and the sliding resistance as mentioned above are responsible for vibration or noise of a vehicle body, affecting the NVH characteristics of the vehicle, and reduce the design freedom of the underbody of a vehicle. Therefore, it is desirable to minimize the induced thrust and sliding resistance as much as possible.

Specifically, in this type of tripod type constant velocity universal joint, when torque is transmitted with an angle, the mutual friction between internal components of the joint causes the induced thrust when the joint is rotating, and when not rotating, the slide resistance if the joint is forcibly extended or contracted in the axial direction. Typical the Noise Vibration Harshness (hereinafter referred to as "NVH") phenomena of a vehicle involving the induced thrust and the sliding resistance include rolling of a vehicle body during traveling, which is caused by the former, and idling vibration at the drive or D range during halting in an automatic transmission vehicle, which is caused by the latter.

For solving the NVH problems in vehicles, it is important to minimize the magnitude of induced thrust or sliding resistance of the joint. In general, the induced thrust or the sliding resistance tends to depend on the magnitude of the working angle. Therefore, when the joint is employed for a drive shaft of a vehicle, restriction is imposed on the design such that the working angle cannot be made large. In order to increase the degree of design freedom of the underbody of a vehicle, there has been problem to stabilize the induced thrust or the sliding resistance at a low level.

On the other hand, in this type of constant velocity universal joint, some wear occurs in the roller guide surface of the outer joint member after its endurance life has expired. In a constant velocity universal joint exhibiting low vibration performance, particularly, there has been a problem that, if wear occurs on the roller guide surface of the outer joint member after expiration of the endurance life, it becomes difficult to reduce the induced thrust due to such wear, and thus the NVH characteristics are deteriorated remarkably.

DISCLOSURE OF THE INVENTION

An object of the present invention is to provide a constant velocity universal joint which is capable of stabilizing the induced thrust and the sliding resistance at a low level after expiration of the endurance life and exhibiting favorable NVH characteristics.

The present invention is a constant velocity universal joint comprising: an outer joint member having three track grooves formed to extend axially in an inner circumference portion thereof, and a roller guide surface formed to extend axially on each side of the respective track grooves; a tripod member having three trunnions protruding in a radial direction; and a roller mechanism mounted in each of the trunnions of the tripod member, the roller mechanism being capable of swinging and oscillating freely with respect to the trunnions, and having a roller that is guided along the roller guide surface in the direction parallel to an axis line of the outer joint member. The constant velocity universal joint is characterized in that the outer peripheral surface of the roller has a surface roughness of 0.35 Ra or less.

In the configuration described above, it is desirable that the roller mechanism be a roller assembly comprising the roller guided by the roller guide surface and a ring fitted externally on the outer peripheral surface of the trunnion and supporting the roller rotatably with a plurality of rolling elements interposed therebetween. Needle rollers may be used as the rolling elements. Further, it is desirable that the inner peripheral surface of the ring of the roller mechanism have a circular convex cross section while the outer peripheral surface of the trunnion has a straight longitudinal section, and that the cross section of the trunnion be a substantially elliptical shape a major axis of which is orthogonal to the axis line of the joint. Here, the "substantially elliptical shape" means not only literal "shape of an ellipse," but also other shapes including those generally called "oval shape" and "oblong shape."

According to the present invention, the outer peripheral surface of the roller has a surface roughness of 0.35 Ra or less, whereby the wear occurring in the roller guide surface of the outer joint member after expiration of the endurance life can be suppressed, hence the induced thrust and sliding resistance caused by such wear can be stabilized at a low level, and favorable NVH characteristics can be obtained.

DESCRIPTION OF THE PREFERRED EMBODIMENTS

Figure 1A:
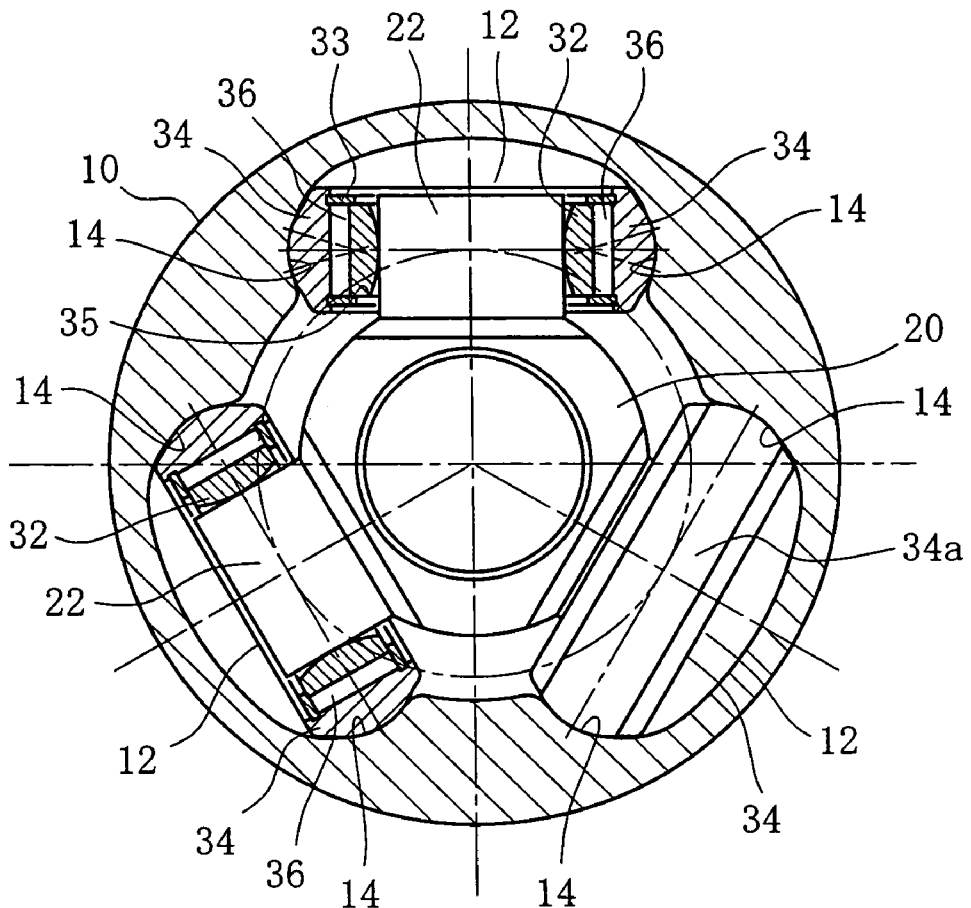
FIG. 1a is a cross sectional view showing an embodiment of a constant velocity universal joint according to the present invention, FIG. 1b a sectional view showing a trunnion and roller assembly in a section vertical to the trunnion, FIG. 1c a sectional view showing a ring.
Figure 1B:
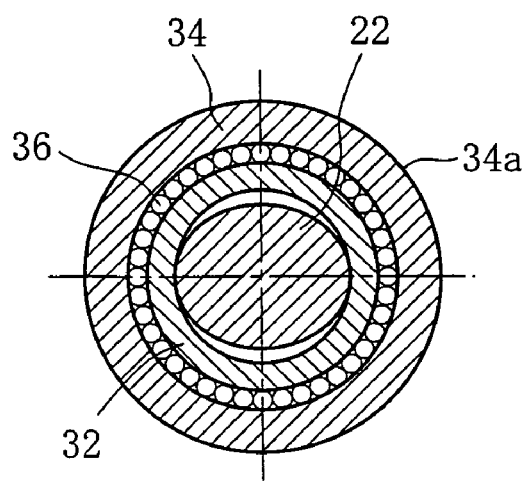
Figure 1C:
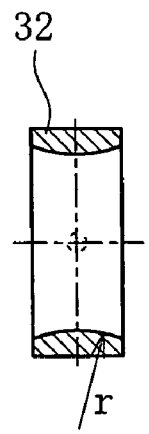
Figure 2:
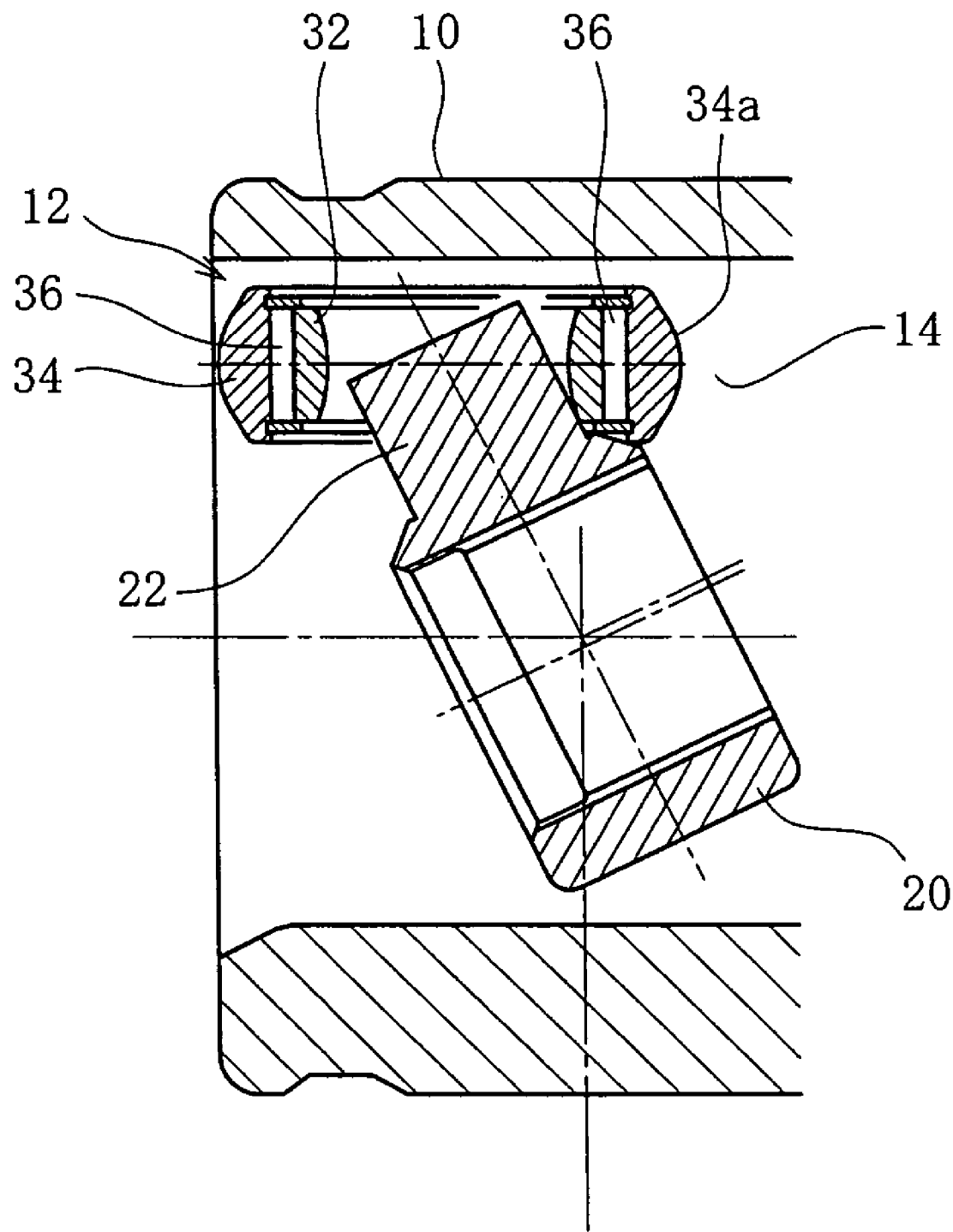
FIG. 2 is a longitudinal sectional view of the constant velocity universal joint of FIG. 1 which is in the state where a working angle is formed.

FIG. 1a is a cross sectional view of a joint, FIG. 1b is a section vertical to the trunnion, and FIG. 1c is a section of a ring.

A tripod type constant velocity universal joint according to this embodiment is constituted chiefly by an outer joint member 10 and a tripod member 20 as shown in FIG. 1. The outer joint member 10 is connected with one of two shafts to be connected together, namely a driving shaft and a driven shaft, and the tripod member 20 is connected with the other shaft, whereby, even when a working angle is formed between the shafts, rotational torque can be transmitted at a constant velocity and, moreover, relative displacement in the axial direction is allowed.

The outer joint member 10 has a substantially cylindrical cup shape, one end of which is open and the other end of which is closed. One of the shafts (not shown) is provided integrally at the other end, and three track grooves 12 extending axially are formed in the inner circumference at 120 degrees intervals around the central axis. Each of the track grooves 12 is provided with a roller guide surface 14 having a concave curved shape, on each of the side walls opposing to each other in the circumferential direction. The tripod member 20 has radially protruding three trunnions 22, and is held by the other shaft (not shown) through serration (spline) engagement. A roller 34 is attached to each of the trunnions 22, and the roller 34 is accommodated in a track groove 12 of the outer joint member 10. The outer peripheral surface 34a of the roller 34 is a convex curved surface conforming to the roller guide surface 14.

The outer peripheral surface 34a of the roller 34 is a convex curved surface whose generating line is constituted by a circular arc having its center of curvature at a position separated from the axis line of the trunnion 22 in the radial direction. The cross sectional shape of the roller guide surface 14 is a "Gothic arch" shape made up of two radii of curvature, and thus the outer peripheral surface 34a of the roller 34 is in angular contact with the roller guide surface 14. In FIG. 1a, the dash-dot lines indicate the operating lines at the positions where the two abut against each other. The angular contact may be achieved also by forming the roller guide surface 14 into a tapered cross sectional shape while forming the outer peripheral surface 34a of the roller 34 into a spherical shape. The angular contact between the outer peripheral surface 34a of the roller 34 and the roller guide surface 14 is effective to prevent the roller 34 from swinging and hence the attitude can be stabilized. Note that, instead of adopting the angular contact, it is also possible, for example, that the roller guide surface 14 is constituted by part of a cylindrical surface whose axis line is parallel with the axis line of the outer joint member 10 so that the cross sectional shape thereof is a circular arc shape corresponding to the generating line of the outer peripheral surface 34a of the roller 34.

The ring 32 is fitted externally on the outer peripheral surface of the trunnion 22. The ring 32 and the roller 34 are unitized with a plurality of rolling elements such as needle rollers 36 interposed therebetween so as to constitute a roller assembly capable of relative rotation. Specifically, the cylindrical outer peripheral surface of the ring 32 serves as the inner track surface while the cylindrical inner peripheral surface of the roller 34 serves as the outer track surface, and the needle rollers 36 are disposed rollably between these inner and outer track surfaces. As shown in FIG. 1b, the needle rollers 36 are mounted without a cage in a so-called "full type" so that as many rollers as possible can be placed. The reference numerals 33 and 35 denote a pair of washers mounted in annular grooves formed in the inner peripheral surface of the roller 34 for preventing the needle rollers 36 from coming off.

When viewed in a longitudinal section, the outer peripheral surface of the trunnion 22 is a straight shape parallel to the axis line of the trunnion 22, whereas when viewed in a cross section, it is an elliptical shape the major axis of which is orthogonal to the axis line of the joint. The cross sectional shape of the trunnion 22 is a substantially elliptical shape by reducing the thickness thereof as viewed in the axial direction of the tripod member 22. In other words, the cross sectional shape of the trunnion 22 is such that the faces thereof opposing to each other in the axial direction of the tripod member 20 are retreated in the mutual directions, namely toward the minor diameter side from a virtual cylindrical surface.

The inner peripheral surface of the ring 32 has a circular convex cross section. Specifically, the generating line of the inner peripheral surface is a convex circular arc having a radius r (see FIG. 1c). In addition to this configuration, since the cross sectional shape of the trunnion 22 is substantially elliptical as described above so that a certain gap is formed between the trunnion 22 and the ring 32, the ring 32 is not only capable of moving in the axial direction of the trunnion 22, but also capable of swinging and oscillating with respect to the trunnion 22. Further, since the ring 32 and the roller 34 are unitized with needle rollers 36 interposed therebetween so as to be capable of rotating relatively, as described above, the ring 32 and the roller 34 are capable of swinging and oscillating as a single unit. Here, "swinging" means that the axis line of the ring 32 and the roller 34 is inclined with respect to the axis line of the trunnion 22 in a plane including the axis line of the trunnion 22.

In the constant velocity universal joint according to the present embodiment, since the trunnion 22 has a substantially elliptical cross section while the inner peripheral surface of the ring 32 has a convex circular cross section, the contact ellipse between them is almost point-like as shown by the broken line in FIG. 1c and the surface area thereof is also reduced. Therefore, the force acting to incline the roller assembly is reduced remarkably in comparison with a conventional technique, and the attitude stability of the roller 34 can be improved further more. Accordingly, the induced thrust and the sliding resistance can be reduced and the range of variation of their values can also be reduced. As a result, the constant velocity universal joint of the present embodiment allows to set low the rated values of induced thrust and sliding resistance and, moreover, to control them accurately within the rated values.

On the other hand, in the constant velocity universal joint of the present embodiment, some wear occurs on the roller guide surface 14 of the outer joint member 10 after expiration of the endurance life. If wear occurs, after expiration of the endurance life, on the roller guide surface 14 of the outer joint member 10 of the constant velocity universal joint exhibiting low vibration performance, in particular, the wear causes the induced thrust to be increased. Therefore, in order to stabilize the induced thrust and the sliding resistance at a low level after the expiration of endurance life, the surface roughness of the outer peripheral surface 34a of the roller 34 that makes contact with the roller guide surface 14 is controlled to 0.35 Ra or less, and preferably to 0.25 Ra or less.

For the present embodiment, a bench endurance test was conducted using samples with the surface roughness of the outer peripheral surface 34a of the roller 34 varied from 0.14 Ra to 0.58 Ra. The roller 34 was made by quenching and tempering bearing steel and ground-finishing the inner and outer peripheral surfaces thereof. On the other hand, the outer joint member 10 having the roller guide surfaces 14 to be in contact with the roller 34 was made by induction hardening and then tempering carbon steel for machine construction.

Figure 3:
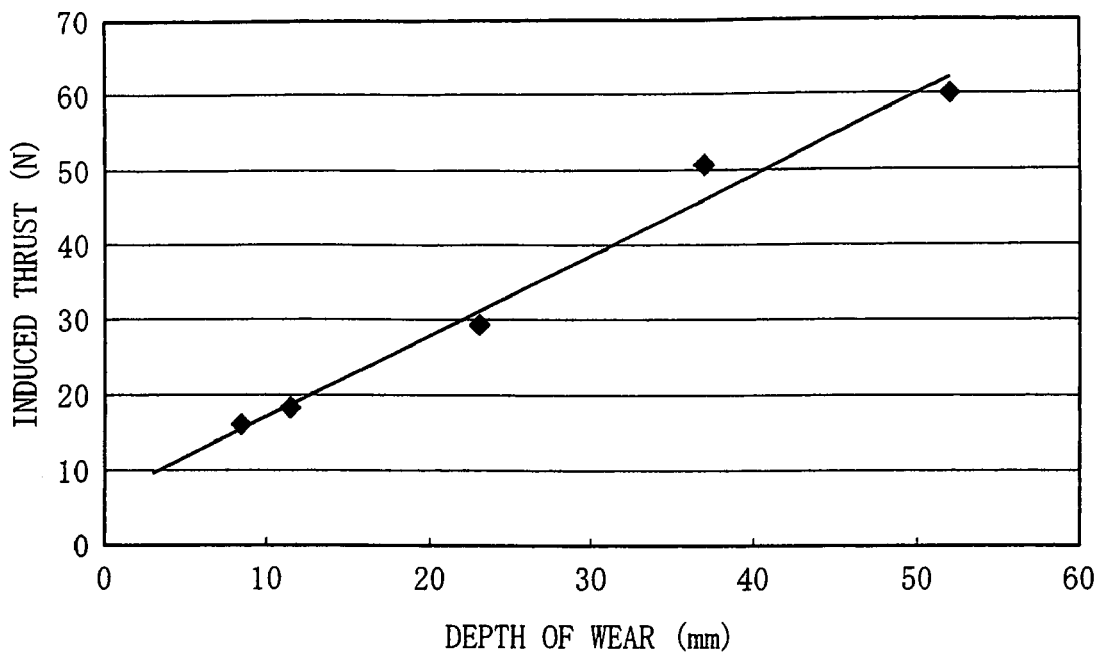
FIG. 3 is a characteristics graph showing the relationship between the induced thrust and the depth of wear in the roller guide surface after an endurance test.

The relationship between the induced thrust and the depth of wear in the roller guide surface 14 after the endurance test is shown in FIG. 3. The induced thrust was measured under the following conditions: torque T=294 Nm, rotational speed S=150 rpm, and operating angle $\Theta$=0 to 15 degrees, and the target value for the induced thrust after the endurance test was set to 30 N. As a result, it was proved that, in order to obtain the target induced thrust value of 30 N, the depth of wear in the roller guide surface 14 after the endurance test is required to be 20 μm or less.

Figure 4:
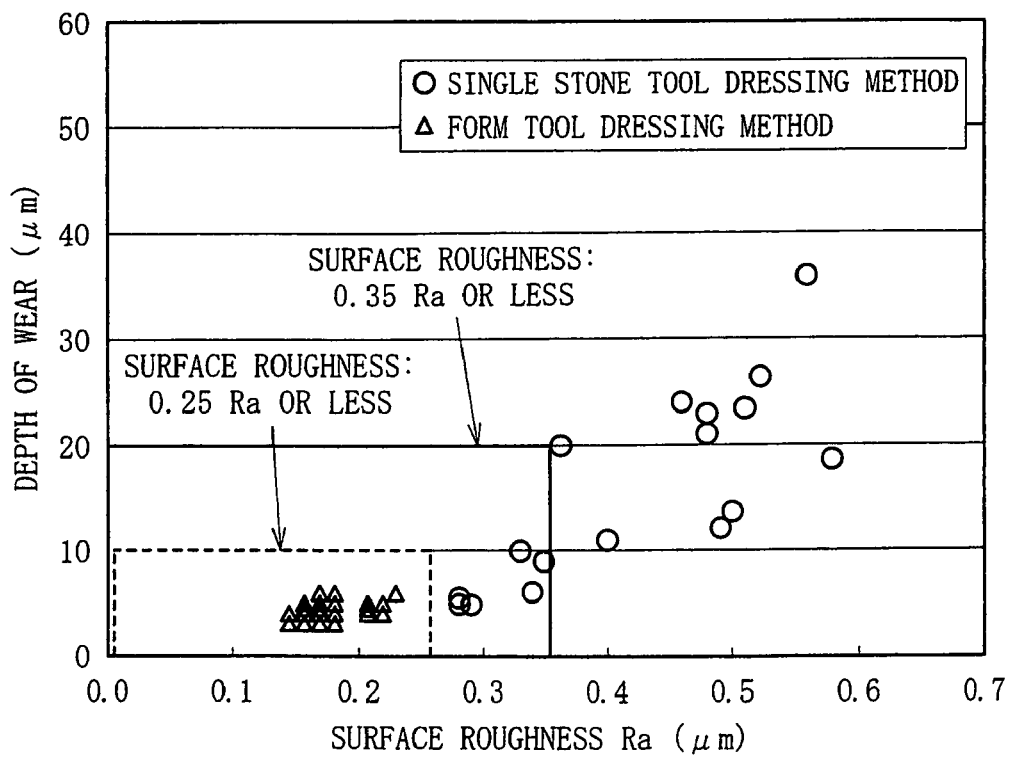
FIG. 4 is a characteristics graph showing the relationship between the surface roughness of the outer peripheral surface of the roller and the depth of wear in the roller guide surface after an endurance test.

The relationship between the surface roughness of the outer peripheral surface 34a of the roller 34 and the depth of wear in the roller guide surface 14 is shown in FIG. 4. As seen from the figure, it was proved that, if the surface roughness of the outer peripheral surface 34a of the roller 34 exceeded 0.35 Ra, it became impossible to control the depth of wear in the roller guide surface 14 to 20 μm or less and the variation was also increased. It can be concluded that, by setting the surface roughness of the outer peripheral surface 34a of the roller 34 to 0.35 Ra or less, the depth of wear in the roller guide surface 14 after the endurance test can be kept to 20 μm or less, which makes it possible to ensure the target induced thrust value of 30 N and hence to stabilize the induced thrust at a low level.

Further, when a single stone tool was used for dressing a grinding wheel for the outer peripheral surface 34a of the roller 34, the surface roughness of the outer peripheral surface 34a of the roller 34 was 0.35 Ra or less as mentioned above, whereas when a form tool was used for dressing the grinding wheel, the surface roughness of the outer peripheral surface 34a of the roller 34 could be suppressed to 0.25 Ra or less, and the wear in the roller guide surface 14 could be improved to 10 μm or less. Here, the "dressing" means truing or toothing of a grinding wheel, and the "single-stone tool dressing method" is a method of dressing a grinding wheel by relatively moving a single diamond tool, while the "form tool dressing method" is a method of dressing a grinding wheel by using a tool having a similar shape to that of a finished product and having a plurality of diamonds enchased therein.

The invention claimed is:

1. A constant velocity universal joint comprising:
   an outer joint member having three track grooves formed to extend axially in an inner circumference portion thereof, and a roller guide surface formed to extend axially on each side of the respective track grooves;
   a tripod member having three trunnions protruding in a radial direction; and
   a roller mechanism mounted in each of the trunnions of the tripod member, the roller mechanism being capable of swinging and oscillating freely with respect to the trunnions, and having a roller that is guided along the roller guide surface in the direction parallel to an axis line of the outer joint member,
   wherein an outer peripheral surface of the roller, which is made by ground-finishing, is in contact with the roller guide surface, and has a final surface roughness of 0.35 Ra (μm) or less.

2. The constant velocity universal joint according to claim 1, wherein
   the roller mechanism is a roller assembly comprising the roller guided by the roller guide surface and a ring fitted externally on the outer peripheral surface of the trunnion and supporting the roller rotatably with a plurality of rolling elements interposed therebetween.

3. The constant velocity universal joint according to claim 1 or 2, wherein
   the cross section of the trunnion is a substantially elliptical shape a major axis of which is orthogonal to the axis line of the joint.

4. The constant velocity universal joint according to claim 1 or 2, wherein
   the inner peripheral surface of the ring of the roller mechanism has a circular convex cross section and the outer peripheral surface of the trunnion has a straight longitudinal section.

5. The constant velocity universal joint according to claim 4, wherein
   the cross section of the trunnion is a substantially elliptical shape a major axis of which is orthogonal to the axis line of the joint.

* * * * *